United States Patent [19]

Hallstrom et al.

[11] 4,064,282

[45] Dec. 20, 1977

[54] STARCH SPONGE PRODUCTS AND THE PROCESS OF PREPARING SAME

[75] Inventors: Curtis H. Hallstrom, Anoka; Brian E. Glass, Plymouth; Ali R. Touba, Mound; George V. Daravingas, Edina, all of Minn.

[73] Assignee: General Mills, Inc., Minneapolis, Minn.

[21] Appl. No.: 642,949

[22] Filed: Dec. 22, 1975

[51] Int. Cl.$^2$ .......................... A23L 1/04; A23B 4/04
[52] U.S. Cl. ................................. 426/559; 106/122; 106/197 C; 106/205; 106/213; 426/444; 426/445; 426/573; 426/576; 426/808; 536/102
[58] Field of Search ............... 536/102; 106/122, 205, 106/213, 197 CMC; 128/296; 426/559, 573, 576, DIG. 808, 444, 445

[56] References Cited

U.S. PATENT DOCUMENTS

| | | | |
|---|---|---|---|
| 2,442,928 | 6/1948 | MacMasters | 106/122 |
| 2,597,011 | 5/1952 | MacMasters et al. | 106/122 |
| 2,899,362 | 8/1959 | Sieger | 128/296 |
| 3,362,831 | 1/1968 | Szczesniak | 426/575 X |
| 3,653,383 | 4/1972 | Wise | 128/296 |
| 3,719,503 | 3/1973 | Podlas | 426/573 |
| 3,800,050 | 3/1974 | Popel | 426/573 X |

*Primary Examiner*—Joan E. Welcome
*Attorney, Agent, or Firm*—Gene O. Enockson; L. MeRoy Lillehaugen

[57] ABSTRACT

Starch sponge products having improved thermal stability and handling characteristics. Process of preparing same employing heat stable gum systems.

9 Claims, No Drawings

STARCH SPONGE PRODUCTS AND THE PROCESS OF PREPARING SAME

The present invention relates to new starch sponge products and the process of preparing same using heat stable gum systems to increase thermal stability and improve handling characteristics.

Starch sponges have previously been proposed for use as bases or carriers for flavoring systems and as texturizing agents in candy bars and the like. See "Starch-Sponge — A Promising New Ingredient" by G. E. Hilbert et al., Food Industries, Vol. 17, No. 8, pages 878–882, August 1945. See also U.S. Pat. No. 2,597,011 to MacMasters and Hoaglund. Generally, the basic starch sponge structure is obtained by cooking a slurry of a raw starch (corn, wheat, potato, tapioca and the like) to fully gelatinize the starch. The resulting starch paste is frozen to cause the gelatinized starch paste to set up an internal structure or starch matrix. After allowing the frozen material to thaw, water is removed therefrom such as by a combination of pressing and drying or simply by conventional drying techniques. The dried starch sponge is crispy with a texture not unlike that of dried bread.

In our work with the above basic system, we found that the starch sponge was difficult to handle after the freezing step and particularly after being dried. Thus the same tended to easily break when definite shaped pieces were to be cut from sheets thereof. Further, we found the starch sponge pieces were incapable of withstanding ordinary cooking operations. In this respect, when flavoring systems were added during the starch sponge preparation to simulate vegetable, fruit and the like flavors, the resulting products were capable of use as crisp snack-like products but could not be used successfully in cooked products, such as in the case of mushroom, bellpepper or other vegetable flavored pieces being used in casserole preparations. Upon cooking or baking, the pieces disintegrated.

We have now discovered that starch sponge products can be materially improved through the addition of a heat-stable gum or gum system during their preparation. While we are not completely sure of the exact role played by the heat-stable gum or gum systems, we believe that the same reinforce the starch sponge structure during dehydration and also protect the structure during cooking, probably through regulation of the rate of rehydration. Our invention has thus provided means whereby simulated vegetable, fruit and the like flavored starch sponge products can be prepared with improved handling characteristics, which products are capable of withstanding normal cooking operations due to their improved thermal stability.

The basic starch sponge preparation is known and forms no part of the present invention. As indicated previously, a raw starch is slurried with water, fully gelatinized by heating, frozen, thawed and dehydrated. Freezing is generally carried out by subjecting the gelatinized starch paste to temperatures of 0° F. or lower. Preferably the freezing step is carried out in a blast freezer at −20° to −40° F. These faster freezing rates yield products with less porosity and hence a stronger structure.

Our invention then involves an improvement in the above process wherein a heat-stable gum or gum system is added during the preparation of the starch sponge products. A variety of heat-stable gum systems can be used. Representative thereof are sodium carboxymethylcellulose rendered heat irreversible by polyvalent metal ions, guar gum, methylcellulose, xanthan gum, sodium alginate and pectin (also rendered heat irreversible by polyvalent metal ions) and the like. These heat-stable gums and gum systems are added to the raw starch slurry prior to the freezing step. The gum system is used in an amount sufficient to improve the thermal stability of the starch sponge products. Preferably, the gum systems will be used in an amount of about 1 to 20% by weight based on the weight of the raw starch.

While the improved starch sponge products of the invention can be unflavored, it is preferred to also include flavoring agents in their preparation. Any of a wide variety of flavoring agents can be used including, without limitation, sugar, salt, hydrolyzed vegetable proteins, natural and artificial vegetable, fruit, meat, fish and the like flavors, citric acid, etc. Coloring agents can also be included, if desired.

The products of our invention can be eaten as such like snack products, used as condiments and the like or combined with other ingredients such as noodles, macaroni, etc. in the preparation of casserole dishes.

The following examples illustrate preferred embodiments of the invention without being limiting. All %'s are by weight unless otherwise indicated.

EXAMPLE I

A mushroom flavored product was prepared from the following ingredients:

|  | % |
|---|---|
| Water | 88.7460 |
| Corn starch | 9.8607 |
| Sodium carboxymethyl-cellulose (CMC 7HF available from Herculues) | 0.2662 |
| Aluminum acetate | 0.0532 |
| Caramel color | 0.0394 |
| Sugar | 0.2958 |
| Salt | 0.2958 |
| Hydrolyzed vegetable protein | 0.0740 |
| Mushroom flavorings | 0.3688 |

The raw starch (98.6 g.) was slurried in 150 g. of water and then 717.46 grams of boiling water to which the sodium carboxymethylcellulose had been added was combined with the slurry. The resulting mixture was heated for ten minutes in a boiling water bath to completely gelatinize the starch. The remaining ingredients were then blended in with the aluminum acetate in 20 g. of water being added last. The gelatinized mixture was poured into a flat pan and spread to desired thickness—i.e. ¼ - ⅜ inch. The mixture was then frozen in a blast freezer at −30° to −40° F. It was removed from the freezer and cut into pieces approximately ⅜ inches × ⅜ inches in size. The cut pieces were placed on screens and air dried in a forced air oven to a moisture content of about 3% by weight.

EXAMPLE II

Example I was essentially repeated except using the following ingredients to produce a green bellpepper flavored product:

|  | % |
|---|---|
| Water | 85.3311 |

-continued

| | % |
|---|---|
| Corn starch | 8.5616 |
| Ground soy hulls | 2.0548 |
| Corn syrup | 1.7123 |
| Sodium carboxymethyl-cellulose | 0.7705 |
| Spinach powder | 0.5993 |
| Aluminum acetate | 0.1541 |
| Salt | 0.1284 |
| Parsley flavor | 0.0009 |
| Bellpepper flavorings | 0.6878 |

The products of Examples I and II were both well flavored and did not disintegrate when used in the preparation of casseroles under twenty minutes of boiling water treatment. In comparison, similar products but without the sodium carboxymethylcellulose-aluminum acetate gum system disintegrated under the same cooking conditions.

EXAMPLES III and IV

Examples I and II were essentially repeated but using the following formulations:

EXAMPLE III
(Mushroom Flavor)

| | % |
|---|---|
| Water | 88.4096 |
| Corn starch | 9.8232 |
| Sodium carboxymethyl-cellulose | 0.4912 |
| Aluminum sulfate | 0.1572 |
| Caramel color | 0.0393 |
| Sugar | 0.2947 |
| Salt | 0.2947 |
| Hydrolyzed vegetable protein | 0.0737 |
| Mushroom flavors | 0.3673 |
| Citric acid | 0.0491 |

EXAMPLE IV
(Bellpepper Flavor)

| | % |
|---|---|
| Water | 83.7370 |
| Corn starch | 8.3736 |
| Ground soy hulls | 2.0097 |
| Corn syrup | 1.6747 |
| Sodium carboxymethyl-cellulose | 0.8374 |
| Spinach powder | 0.5862 |
| Aluminum sulfate | 0.2680 |
| Salt | 0.1256 |
| Citric acid | 0.0837 |
| Bellpepper flavors | 2.3041 |

EXAMPLE V

Example III was essentially repeated except methylcellulose gum was used in place of the sodium carboxymethylcellulose-aluminum sulfate gum system and the ingredients were used in the following %'s:

| | % |
|---|---|
| Water | 88.1584 |
| Corn starch | 9.7954 |
| Methylcellulose (Methocel®) | 0.9795 |
| Caramel color | 0.0392 |
| Sugar | 0.2939 |
| Salt | 0.2939 |
| Hydrolyzed vegetable protein | 0.0734 |
| Mushroom flavors | 0.3663 |

Again, a product with good heat stability and flavor was obtained. Equally good results were obtained with guar gum (Super Col M) and xanthan gum (Ketrol F) as replacements for the methylcellulose. A somewhat less heat stable product was obtained with hydroxypropylcellulose (Klucel) in place of methylcellulose. However, such product had improved thermal stability over products not containing a heat stable gum system.

EXAMPLE VI

A mushroom flavored product was prepared as in Example I from the following ingredients:

| | % |
|---|---|
| Water | 88.0781 |
| Corn starch | 9.7865 |
| Pectin | 0.9787 |
| Caramel color | 0.0391 |
| Sugar | 0.2936 |
| Salt | 0.2936 |
| Hydrolyzed vegetable protein | 0.0734 |
| Dibasic calcium phosphate | 0.0910 |
| Mushroom flavors | 0.3660 |

The pectin-dibasic calcium phosphate system yielded a good product having heat stability properties as in the Examples above.

EXAMPLE VII

A bacon flavored product was prepared as in Example I from the following ingredients:

| | % |
|---|---|
| Water | 80.5968 |
| Corn starch | 8.9551 |
| Sodium carboxymethyl-cellulose | 0.4478 |
| Aluminum sulfate | 0.1433 |
| Citric acid | 0.0448 |
| Hydrolyzed vegetable protein | 2.4394 |
| Salt | 1.9531 |
| Sugar | 1.8063 |
| Corn oil | 3.4388 |
| Smoke flavor | 0.0358 |
| FD & C Red #3 | 0.0045 |
| Caramel color | 0.1343 |

After drying to about 10% moisture, the pieces were puffed by conventional processes—i.e. salt puffing, gun puffing and deep fat frying (20 seconds at 375° F.). After deep fat frying, the pieces had a crunchy texture (in contrast to the hard, tough texture of the unpuffed pieces) and were eminently suitable as a snack item or a condiment. The gum system facilitated the handling of the products including the puffing operations.

Further in regard to the examples, good products are also obtained using other raw starches (wheat, potato, tapioca, etc.) whereas modified or pregelatinized starches do not yield acceptable products. Additionally, the unflavored or vegetable, fruit or other flavored products can also be puffed as in Example VII.

The embodiments of the invention in which an exclusive property or privilege is claimed are defined as follows:

1. In the process of preparing a starch sponge food product wherein an aqueous slurry of raw starch is heated to completely gelatinize the starch, the resulting starch paste is frozen to set-up the starch matrix, and the frozen matrix is allowed to thaw and is dehydrated to yield the starch sponge product, the improvement consisting of adding a heat stable gum or gum system to the slurry in an amount sufficient to improve the thermal stability of the starch sponge product.

2. The process of claim 1 wherein the heat-stable gum or gum system is used in an amount of about 1 to 20% by weight based on the weight of the raw starch.

3. The process of claim 1 wherein flavoring and/or coloring agents are added to the starch slurry prior to the freezing thereof.

4. The process of claim 1 wherein the heat-stable gum system is sodium carboxymethylcellulose and a polyvalent metal ion.

5. The process of claim 4 wherein the polyvalent metal ion is aluminum and is obtained from a water-soluble salt of aluminum.

6. The process of claim 1 wherein the heat-stable gum is guar gum.

7. The starch sponge food product having improved thermal stability prepared by the process of claim 1.

8. The process of claim 1 wherein the improved starch sponge food product is also puffed.

9. The puffed starch sponge food product prepared by the process of claim 8.

* * * * *